April 21, 1936. J. J. WORTELBOER 2,038,018
VEGETABLE PEELING MACHINE
Filed May 9, 1935 2 Sheets-Sheet 1
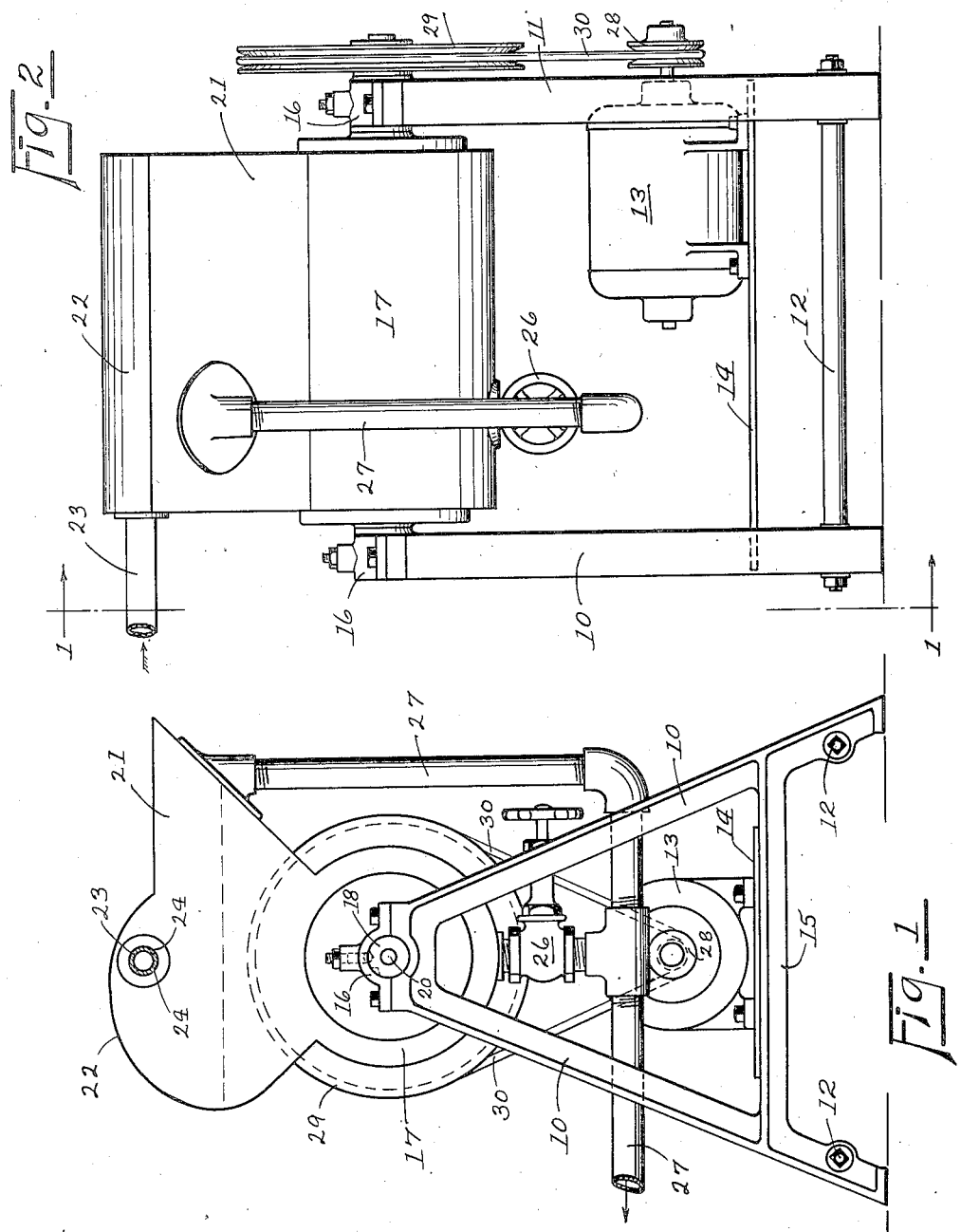
Witness:
Geo L. Chapel
James J Wortelboer
INVENTOR.
BY Rice and Rice
ATTORNEYS.

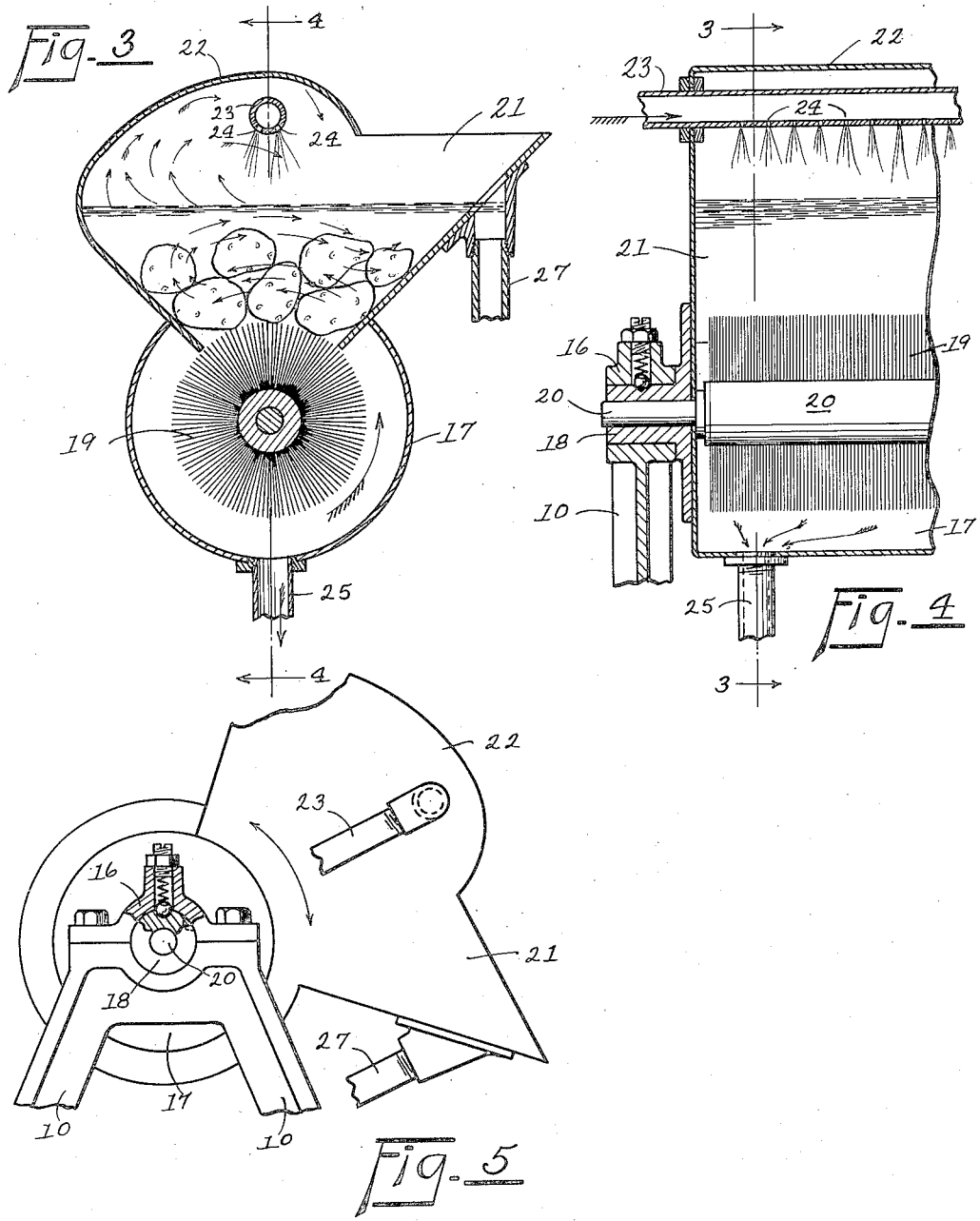

Patented Apr. 21, 1936

2,038,018

UNITED STATES PATENT OFFICE 2,038,018

VEGETABLE PEELING MACHINE

James J. Wortelboer, Muskegon Heights, Mich.

Application May 9, 1935, Serial No. 20,619

3 Claims. (Cl. 146—49)

The instant invention relates to vegetable peeling machines and more particularly to a machine especially adapted for peeling potatoes, carrots, turnips, rutabagas and the like.

The primary objects of the present invention are to provide a machine of the character above indicated which is especially adapted for use in hotels, restaurants and the like although it will be understood of course that smaller machines are equally adaptable for domestic or home use; to provide such a machine in which water for carrying off the waste may be admitted to and drained from the machine during the peeling operation; to provide such a machine having a hopper which may be manually up-ended for dumping the vegetables after the peeling operation has been completed; and, to provide such a machine which is efficient in operation, utilitarian in use and economical in manufacture.

An illustrative embodiment of the invention is shown in the accompanying drawings, wherein:—

Figure 1 is a side elevational view of the machine on line 1—1 of Figure 2;

Figure 2 is a front elevational view thereof;

Figure 3 is a sectional view on line 3—3 of Figure 4;

Figure 4 is a fragmentary sectional view on line 4—4 of Figure 3; and

Figure 5 is a fragmentary side elevational view of the machine, partly in section, showing the hopper tipped toward up-ended position for dumping the vegetables after the peeling operation.

Referring to these drawings in which like parts of the machine there shown are designated by the same numerals in the several views, a frame support comprises a pair of vertically disposed triangularly formed members 10, 11, here shown as castings secured together in spaced relation by tie rods 12. An electric motor 13, within an electric circuit, not shown, is mounted upon a base member 14 supported upon and secured to the cross members 15 of the triangularly formed castings 10, 11.

The upper ends of each of the vertically spaced members 10, 11 forming the frame for the machine, are provided with a journal bearing 16 and a cylindrical casing 17 preferably of metal and having an open top as best shown in Figure 3 is provided at its opposite ends with a stub shaft 18 disposed within a journal bearing 16 adapting the transverse or horizontally disposed casing to be tilted to up-ended position as indicated by the double ended arrow in Figure 5.

A cylindrical brush 19 secured to a shaft 20 is rotatably disposed within the cylindrical casing 17, the outer ends of the shaft being disposed within the stub shafts 18 which form journal bearings therefor. A hopper 21 for the reception of vegetables to be peeled and likewise preferably formed of metal, is secured to and mounted upon the cylindrical casing 17 above its opening and is here shown as provided with an arcuate hood 22 over a portion of its top.

A water supply conduit 23 having spaced water emitting jets 24 for supplying fresh water to the hopper 21 and to the cylindrical casing 17 during the peeling operation is horizontally positioned at the top of the hopper below the arcuate hood 22 and extends substantially the length thereof. A water outlet 25 having a manually operable valve 26 depends from the lower end of the cylindrical casing 17 and is connected with the overflow conduit 27 whereby the rate of flow of water through the machine may be adjustably controlled by the manually operable valve 26 and overflow is prevented by the overflow conduit 27.

The shafts of the electric motor 13 and of the cylindrical brush 19 are respectively provided with pulley wheels 28, 29 and a belt 30 running over these pulley wheels revolves the brush during the operation of the motor.

Operation

In operation, vegetables to be peeled, such as potatoes, are placed in the hopper, water is admitted thereto and the motor is then turned on. As the brush is thus caused to be revolved in the direction indicated by the arrow in Figure 3, the potatoes or other vegetables within the hopper are caused to mill about in the direction of the indicating arrows in the same figure and the water is likewise caused to be splashed upwardly and reversely as similarly indicated by the arrows carrying with it the peelings, dirt and froth to the overflow pipe through which they flow therefrom. When the peeling operation is completed, the hopper and the cylindrical casing may be up-ended to dump the peeled vegetables as indicated in Figure 5.

It will thus be seen that the machine herein shown and described is adaptable both for commercial and domestic use and that the machine is efficient in operation, utilitarian in use, and economical in operation. Although the machine is here shown as power operated and its peeling instrumentability is that of a rotating cylindrical brush, it will be understood of course that any other suitable rotating element having a roughened or abrasive surface may be substituted and that the peeling instrumentality may be manually operated as by a crank.

While but one specific embodiment of this invention has been herein shown and described, it will be understood that numerous details of the construction shown may be altered or omitted without departing from the spirit of this invention as defined by the following claims.

I claim:

1. In a structure of the class described, a pair of vertically disposed members secured together in spaced relation to form a frame support, a journal bearing in each vertically disposed member, a transverse cylindrical casing having a stub shaft at each of its outer ends disposed within a journal bearing, a rotatable cylindrical brush within the cylindrical casing, a hopper secured to and mounted above the cylindrical casing provided with an arcuate hood over a portion of the top thereof, an inlet conduit for supplying water to the hopper beneath the arcuate hood, and an outlet conduit for draining water from the cylindrical casing.

2. In a structure of the class described, a pair of vertically disposed members secured together in spaced relation to form a frame support, a journal bearing in each vertically disposed member, a transverse cylindrical casing having a stub shaft at each of its outer ends disposed within a journal bearing, a rotatable cylindrical brush within the cylindrical casing, a hopper secured to and mounted above the cylindrical casing provided with an arcuate hood over a portion of the top thereof, an inlet conduit for supplying water to the hopper beneath the arcuate hood, an outlet conduit for draining water from the cylindrical casing, and an overflow conduit from the hopper connected with the outlet conduit.

3. In a structure of the class described, a pair of vertically disposed members secured together in spaced relation to form a frame support, a journal bearing in each vertically disposed member, a transverse cylindrical casing having a stub shaft at each of its outer ends disposed within a journal bearing, a rotatable element within the cylindrical casing having a roughened peripheral surface, a hopper secured to and mounted above the cylindrical casing provided with an arcuate hood over a portion of the top thereof, an inlet conduit for supplying water to the hopper beneath the arcuate hood, and an outlet conduit for draining water from the cylindrical casing.

JAMES J. WORTELBOER.